UNITED STATES PATENT OFFICE.

JOHN K. GEORGE, OF CHICAGO, ILLINOIS, ASSIGNOR TO CLASSEN LIGNUM COMPANY, OF CHICAGO, ILLINOIS, A CORPORATION OF NEW JERSEY.

PROCESS OF FORMING A FOOD PRODUCT.

981,634.　　　　　Specification of Letters Patent.　　Patented Jan. 17, 1911.

No Drawing.　　　Application filed April 5, 1909.　Serial No. 487,961.

*To all whom it may concern:*

Be it known that I, JOHN K. GEORGE, a citizen of the United States, residing at Chicago, in the county of Cook and State of Illinois, have invented certain new and useful Improvements in Processes of Forming a Food Product, of which the following is a specification.

The object of my invention is to provide an improved process for the utilization of the cellulose and saccharine material remaining after the treatment of wood or other organic materials for the production of alcohol. In processes of this nature the wood or other material is digested with mineral acids, sulfurous acid being suitable for the purpose, thus largely converting the cellulose of the material treated into sugars, which are afterward fermented for the production of ethyl alcohol.

My improved process relates to the production of alcohol in this manner and the utilization of the unconverted cellulose and unfermented sugars, which remain after the completion of the processes of conversion and fermentation, as a food product for horses, cattle, etc.

According to my process the wood or other organic material after being suitably comminuted is treated in digesters with a mineral acid for the purpose of converting the cellulose as far as may be into fermentable sugars. As an incident of this step a certain proportion of formic and acetic acids is formed. In order to avoid interference by these acids with the subsequent step of fermentation it is necessary that they be either neutralized by the addition of a base, or that they be otherwise expelled from the digested mass. Owing to the difficulty of perfectly neutralizing the resulting acids, and the effect of the salts resulting from the neutralization of the acids upon the subsequent step of fermentation, I expel the acids formed during the conversion of the organic material into sugar by treatment with steam. Subjecting the mass to treatment with steam volatilizes and carries away the organic acids formed during the step of conversion and leaves the mass free from substances having an adverse effect upon the step of fermentation. After the expulsion of the organic acids in the manner referred to, I subject the entire mass to fermentation and distillation without previously separating the sugars therefrom. After this step there remains a mass of tailings consisting of the residue of the wood or other matter used in the process. This residue consists principally of a cellulose product with some admixture of saccharine matter and in order to convert the same into a nutritious food product I add thereto molasses of low grade or other similar saccharine matter. The residue left over after fermentation and distillation is after being dried of a very absorbent nature and readily takes up the molasses or other saccharine substance added, the resulting food product being of high nutritious value, since the proportion of organic and inorganic substances contained therein is such that it forms a readily assimilated product in which the sugars contained in the saccharine matter, cellulose and molasses differ chemically. It has been found that if the moisture in the converted cellulose be reduced to about 10%, a quantity of molasses about equal to the remaining solid matter should be added.

What I claim is:

1. The process of manufacturing a food product from wood which comprises the steps of digesting the wood with an acid to convert cellulose into sugars and to render the residue of the wood digestible, expelling the acids from the resulting mass, and adding molasses to the product thus obtained.

2. The process of manufacturing a food product from wood which comprises the steps of digesting the wood with an acid to convert cellulose into sugars and to render the residue of the wood digestible, expelling the acids from the resulting mass, removing part of the fermentable sugars, and adding molasses to the residue.

In testimony whereof, I have subscribed my name.

JOHN K. GEORGE.

Witnesses:
　WALTER A. SCOTT,
　EDYTHE M. ANDERSON.